United States Patent
Pena Ocampo et al.

(10) Patent No.: US 11,049,076 B2
(45) Date of Patent: Jun. 29, 2021

(54) ROUTING OF MEETING REQUESTS AND FOLLOW-UP QUERIES BY DIGITAL ASSISTANTS

(71) Applicant: Microsoft Technology Licensing, LLC, Redmond, WA (US)

(72) Inventors: Juliana Pena Ocampo, Redmond, WA (US); Mayerber Loureiro De Carvalho Neto, Kirkland, WA (US); Charles Yin-Che Lee, Mercer Island, WA (US); Ben Cheung, Redmond, WA (US); Pamela Bhattacharya, Redmond, WA (US); Chala Fekadu Fufa, Seattle, WA (US); Warren David Johnson, III, Sammamish, WA (US)

(73) Assignee: Microsoft Techology Licensing, LLC, Redmond, WA (US)

( * ) Notice: Subject to any disclaimer, the term of this patent is extended or adjusted under 35 U.S.C. 154(b) by 463 days.

(21) Appl. No.: 15/973,168

(22) Filed: May 7, 2018

(65) Prior Publication Data
US 2019/0340581 A1 Nov. 7, 2019

(51) Int. Cl.
G06Q 10/10 (2012.01)
H04L 12/58 (2006.01)
H04L 12/18 (2006.01)

(52) U.S. Cl.
CPC ....... G06Q 10/1095 (2013.01); G06Q 10/107 (2013.01); H04L 12/1818 (2013.01); H04L 51/02 (2013.01)

(58) Field of Classification Search
CPC . H04L 12/1818; H04L 51/02; G06Q 10/1095; G06Q 10/107; G06Q 10/109; G06Q 10/10
(Continued)

(56) References Cited

U.S. PATENT DOCUMENTS 6,163,794 A * 12/2000 Lange .................... H04L 63/10
709/202
6,988,128 B1 1/2006 Alexander et al.
(Continued)

FOREIGN PATENT DOCUMENTS

WO 2012048163 A2 4/2012
WO 2015094169 A1 6/2015

OTHER PUBLICATIONS

How to Assign a Delegate to manage your calendar in Outlook 2016. Jul. 10, 2018.*
(Continued)

*Primary Examiner* — Johnna R Loftis

(57) ABSTRACT

In non-limiting examples of the present disclosure, systems, methods and devices for routing meeting requests by a digital assistant service are presented. A request to schedule a meeting between an invitee and a principal may be received by a digital assistant service, wherein the request is sent by an agent of the principal. The digital assistant service may determine that the agent is a delegate of the principal with scheduling authority. The digital assistant service may further determine that follow-up information for the meeting is required, and the digital assistant service may route an electronic message requesting the follow-up information directly the agent-delegate. Other aspects describe mechanisms for routing meeting requests from third parties directly to delegates, rather than sending those communications directly to principals.

18 Claims, 10 Drawing Sheets

(58) Field of Classification Search
USPC .............................................. 705/7.19, 7.18
See application file for complete search history.

(56) References Cited

U.S. PATENT DOCUMENTS

| | | | |
|---|---|---|---|
| 7,805,676 B2 | 9/2010 | Schemers et al. | |
| 8,995,972 B1* | 3/2015 | Cronin .................... | G06F 3/167 |
| | | | 455/414.3 |
| 9,172,747 B2 | 10/2015 | Walters et al. | |
| 2008/0109517 A1* | 5/2008 | Sarkar ................... | G06Q 10/109 |
| | | | 709/206 |
| 2008/0120692 A1* | 5/2008 | Gupta ................. | H04L 65/1096 |
| | | | 726/1 |
| 2009/0060162 A1* | 3/2009 | Lachhiramka ........ | H04M 3/527 |
| | | | 379/214.01 |
| 2009/0222747 A1* | 9/2009 | May ..................... | G06Q 10/109 |
| | | | 715/764 |
| 2009/0319926 A1 | 12/2009 | Chakra et al. | |
| 2014/0047001 A1* | 2/2014 | Phillips ................. | G06Q 10/10 |
| | | | 709/202 |
| 2014/0253666 A1* | 9/2014 | Ramachandran ....... | H04W 4/12 |
| | | | 348/14.06 |
| 2015/0045003 A1* | 2/2015 | Vora ........................ | H04M 1/64 |
| | | | 455/412.2 |
| 2015/0142704 A1* | 5/2015 | London ................... | G06F 40/58 |
| | | | 706/11 |
| 2015/0373183 A1* | 12/2015 | Woolsey ............. | H04M 1/7255 |
| | | | 348/14.08 |
| 2016/0014222 A1* | 1/2016 | Chen ....................... | H04L 67/22 |
| | | | 709/204 |
| 2016/0098687 A1* | 4/2016 | Lamons ............. | G06Q 10/1095 |
| | | | 705/7.19 |
| 2017/0270488 A1* | 9/2017 | Spencer, Jr. ....... | G06Q 10/1097 |
| 2017/0277993 A1 | 9/2017 | Beaver et al. | |
| 2018/0089633 A1 | 3/2018 | Johnson et al. | |
| 2018/0315414 A1* | 11/2018 | Hardee ................... | G10L 15/22 |
| 2019/0028587 A1* | 1/2019 | Unitt ....................... | G06F 9/453 |
| 2020/0243186 A1* | 7/2020 | Gallopyn ............... | G16H 40/20 |

OTHER PUBLICATIONS

Exchange—Outlook 2016—Issues with delegate access and address book. Archived from Technet.microsoft.com/forum Mar. 2016.*
Pittsley, Steven. How do I . . . Configure delegate access in Microsoft Outlook? Sep. 7, 2006. www.techrepublic.com.*
Cannot delete meetings in calendar if you are a delegate in Outlook 2010. Archived from Technet.microsoft.com/forum Apr. 2011.*
"International Search Report and Written Opinion Issued in PCT Application No. PCT/US19/029766", dated Jul. 12, 2019, 10 Pages.
"Evie", Retrieved from: https://evie.ai/, Retrieved on: Apr. 18, 2018, 1 Page.
Cranshaw, et al., "Calendar.help: Designing a Workflow-Based Scheduling Agent with Humans in the Loop", In Proceedings of the CHI Conference on Human Factors in Computing Systems, May 6, 2017, 12 Pages.
Monroy-Hernandez, et al., "How We Built a Virtual Scheduling Assistant at Microsoft", Retrieved from: https://hbr.org/2017/07/how-we-built-a-virtual-scheduling-assistant-at-microsoft, Jul. 28, 2017, 6 Pages.

* cited by examiner

ROUTING OF MEETING REQUESTS AND FOLLOW-UP QUERIES BY DIGITAL ASSISTANTS

BACKGROUND

Executives and other entity managers are generally quite busy, and scheduling of their time with others is sometimes deferred to their human assistants to minimize the time pressures of organizing such events on the executives and managers, leaving the executives and managers more time for performing high-level tasks. Although human assistants have the ability to send meeting requests from their principals' (executives and managers) email accounts in an "on behalf of" capacity, follow-up electronic message queries related to those meeting requests are nonetheless sent back to the principals' electronic messaging accounts, causing the principals' to be bombarded with messages that could be easily resolved by their human assistants.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for routing scheduling communications by a digital assistant service. Executives and managers (principals) may have assistants (agents) that they can assign certain low-level tasks to in order to free up time for accomplishing more high-level tasks. In some examples, a principal may authorize an agent-delegate to schedule meetings for and with the principal and deal with scheduling communications for the principal. The principal may authorize the agent-delegate utilizing one or more authorization settings associated with a digital assistant service, an electronic messaging account of the principal, a calendar application account of the principal, and/or a contacts application account of the principal. In examples, the agent-delegate, once authorized, may send meeting invites from the principal's electronic messaging account to third parties, and requests for additional information related to the meeting sent from the digital assistant service and/or the third parties may be automatically routed to the delegate despite the corresponding meeting invites being sent from the principal's account. In additional examples, when third parties send meeting requests to the principal, those requests may be sent through a digital assistant service and routed to an agent-delegate of the principal.

BRIEF DESCRIPTION OF THE DRAWINGS

Non-limiting and non-exhaustive examples are described with reference to the following figures.

DETAILED DESCRIPTION

Figure 1:
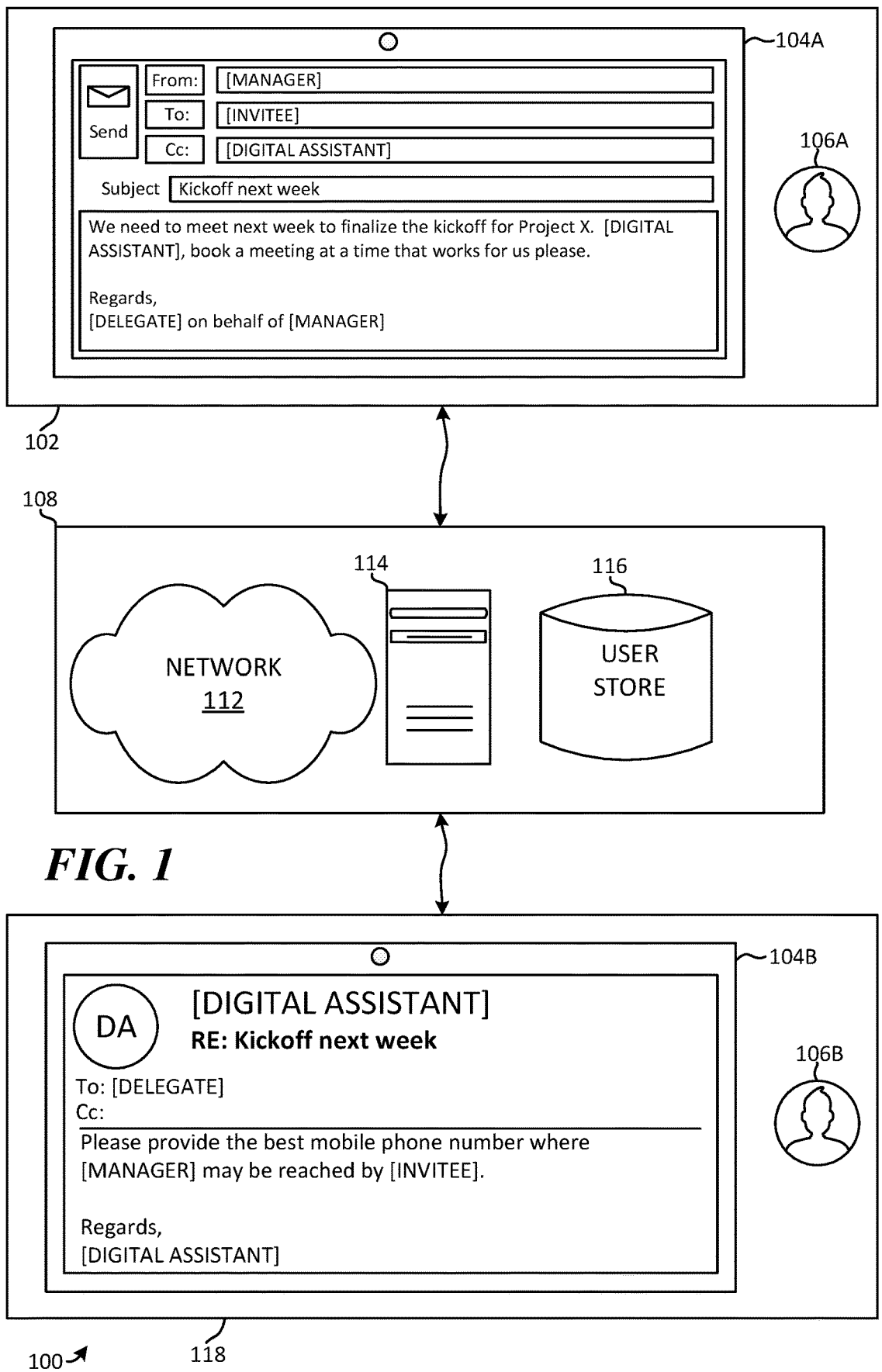
FIG. 1 is a schematic diagram illustrating an example distributed computing environment for routing automated meeting request follow-up queries by a digital assistant.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The various embodiments and examples described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the claims.

Examples of the disclosure provide systems, methods, and devices for routing meeting requests and follow-up queries by a digital assistant service. As used herein, "principal" refers to a user of a digital assistant service that has indicated via one or more settings associated with the digital assistant service, an electronic messaging account, a calendar application, and/or a contacts application, that another user of the digital assistant service has delegate authority to send and receive electronic messages from the principal's electronic messaging account and schedule meetings on the principal's behalf. As used herein "delegate" and "agent" refer to a user that has been authorized, via one or more settings associated with a digital assistant service, electronic messaging account, calendar application, and/or a contacts application, to send and receive electronic messages from a principal's electronic messaging account and schedule meetings on a principal's behalf.

A principal may access that has an email account associated with a digital assistant service (e.g., Cortana, Siri, Alexa) may access a settings menu associated with the email account and/or digital assistant service and authorize a delegate to interact with the digital assistant service to schedule meetings between the principal and third parties. The principal may also authorize the delegate, via the settings menu, to send emails from the principal's email account on behalf of the principal and have all or a subset of emails sent to the principal forwarded directly to the delegate's email account. In some examples, the principal may authorize, via the settings menu, a delegate to have only those emails that are sent to the principal's email address, with the digital assistant service also included in the "to" and/or "Cc" fields, sent directly to the delegate's email address. In some examples the principal, upon authorizing the delegate to receive such emails, may also receive a copy of those emails (i.e., the delegate and the principal will receive emails sent to the principal's email address with the digital assistant service included in the "to" or "Cc" fields. In other examples, the principal, upon authorizing the delegate to receive such emails, may not receive a copy of those emails (i.e., only the delegate will receive emails sent to the principal's email address with the digital assistant service included in the "to" or "Cc" fields).

A delegate that has been authorized by a principal (via digital assistant service settings, email account settings, calendar settings, and/or contacts settings) may sign into the principal's email account in a delegate capacity, and draft an email to schedule a meeting between the principal and one or more third-parties. The email may include a digital assistant service (e.g., cortana@calendar.help) in the "to" and/or "Cc" fields so that the digital assistant service can attempt to automatically broker the meeting. For example, if the delegate drafts an email that states in the body: "setup meeting between [PRINCIPAL] and [INVITEE A] for an hour next week," and the digital assistant service has been authorized by both the principal and invitee A to access their corresponding calendars, the digital assistant service may automatically identify an hour in the next week that is available for the principal and invitee A, and the digital assistant service may set a meeting for that time in calendar applications for the principal and invitee A.

In some examples, the digital assistant service may identify an ambiguity for the meeting that needs clarification. Ambiguities that may need clarification may include one or more of: a location where a meeting is to take place, contact information of one or more attendees of a remote meeting (e.g., telephone number, instant messaging alias), a date that the meeting is to take place (e.g., if there is more than one mutually available date among the attendees, if there are no mutually available dates among the attendees), and a time that the meeting is to take place (e.g., if there is more than one mutually available time among the attendees, if there is no mutually available time among the attendees). In such a scenario, because the scheduling email was sent from the principal's email account by the delegate utilizing delegate authority authorized by the principal's settings, the digital assistant service may contact the delegate directly to clear up the identified ambiguity. That is, the digital assistant service may send a query directly to the delegate to resolve the ambiguity, without contacting the principal. Examples of clarification queries that may be sent to the delegate from the digital assistant service include: "what phone number can [PRINCIPAL] be reached at?" "what building and room number should I book for this meeting?" "[INVITEE] isn't available next week, is the week after OK?" "There are three dates/times available for this meeting, which do you prefer?". In this manner, the principal, who is likely an executive or high-level manager, can spend less time dealing with low-level scheduling issues, and more time dealing with higher level tasks.

In additional examples, the digital assistant service may send a notification to a delegate and/or a principal when an event has been successfully scheduled by the digital assistant service. For example, when the digital assistant service receives a request from a delegate to schedule a meeting with a third-party on behalf of a principal, and the meeting is successfully scheduled, the digital assistant service may then send a message to the delegate and/or the principal indicating that the meeting has been successfully booked. In other examples, the digital assistant service may send a notification to a delegate and/or a principal when a condition of a request from a delegate cannot be successfully filled and/or the condition changes. For example, when the digital assistant service receives a request from a delegate to schedule a meeting for a specific time, date, and/or location with a third-party on behalf of a principal, and one or more of the specific time, date, and/or location cannot be met, the digital assistant may notify the delegate and/or the principal of a change in fulfilling the request (i.e., a change to the time, date and/or location).

In other examples, one or more invitees included on a scheduling email sent by the delegate from the principal's email account utilizing delegate authority may reply to the scheduling email. An invitee may reply to the email for similar reasons as the ambiguities described above (e.g., time, date, location), or for other reasons that are not clearly defined meeting ambiguities (e.g., "where should I park?", "where should I meet you when I get there?"). In such a scenario, because the scheduling email was sent from the principal's email account by the delegate utilizing delegate authority authorized by the principal's settings, the digital assistant service may route the invitees' reply emails directly to the delegate's email account, rather than sending the reply to the principal's email account. That is, the digital assistant service may send any follow-up replies from the invitees on a meeting request/invite email directly to the delegate for further input, without burdening the principal with low-level scheduling tasks.

In other examples, a third-party user may utilize the digital assistant service to setup a meeting with a principal. That is, a third-party user may send an email with the principal's email address in the "to" field, with the digital assistant service (e.g., cortana@calendar.help) in the "to" and/or "Cc" fields, with a request to schedule a meeting between the third-party and the principal. If the principal has authorized a delegate, via settings associated with the principal's digital assistant service, email account, calendar application and/or contacts application, to handle scheduling communications sent to the principal's email address and/or the digital assistant service, the third-party's scheduling email may be routed directly to the delegate's email account rather than being sent to the principal's email account. Any follow-up communications (e.g., emails from the digital assistant service to resolve ambiguities, emails from the third-party) may similarly be routed directly to the delegate rather than the principal. In this manner, the principal is shielded from having to personally respond to third-party meeting requests and follow-up, leaving those tasks to users that have been granted delegate authority.

The systems, methods and devices described herein for intelligently routing scheduling communications by a digital assistant service may also be utilized to provide a recruiter with capabilities to initiate meetings between invitees and hiring managers, and have any invitee replies to original meeting initiation communications sent directly to hiring managers. That is, and API associated with a meeting scheduling application may allow a first party (e.g., a recruiter) to send a communication to a first third-party (e.g., an invitee/interview candidate), and in some cases a second third-party (e.g., a hiring manager), via digital assistant service routing, and have the API specify that any replies to the initial scheduling communication by the first third party (e.g., an invitee/interview candidate) be directly routed to the second third-party (e.g., a hiring manager).

FIG. 1 is a schematic diagram illustrating an example distributed computing environment 100 for routing automated meeting request follow-up queries by a digital assistant. Distributed computing environment 100 includes meeting creation sub-environment 102, network and processing sub-environment 108, and meeting follow-up sub-environment 118.

Meeting creation sub-environment 102 includes computing device 104A, which delegate-user 106A is utilizing to schedule a meeting for his manager. Delegate-user 106A has been authorized by his manager to schedule meetings on the manager's behalf using the manager's email account. That is, the manager has modified settings associated with her email account and calendar application that allow delegate-user 106A to schedule meetings for her using her digital assistant and email account.

In meeting creation sub-environment 102, delegate-user 106A has signed into his manager's email account in a delegate role, and drafted a meeting invite email to an invitee. The delegate includes the invitee's email address in the "to" field of the email, the manager's digital assistant (e.g., Cortana, Alexa, Siri) in the "Cc" field of the mail, and in the body of the email the delegate has asked the digital assistant to book a meeting time for the manager and the invitee to meet sometime the next week. When the delegate-user 106A sends the meeting request email, their signature states that the email is sent by delegate-user 106A on behalf of his manager because of the delegate capacity that he is signed in to his manager's email account.

Network and processing sub-environment 108 includes network 112, server computing device 114, and user store 116. Server computing device 114 and user store 116 provide a basic example of devices of a digital assistant service utilized in implementing aspects described herein. Computing device 104A and 104B, which are the same computing device at different times, may communicate with the digital assistant service via network 112. Server computing device may perform one or more operations associated with routing meeting requests and follow-up queries to appropriate users, and user store 116 may comprise a cloud-based database for users' calendar entries, appointments, and meetings, as well as contacts information (email addresses, instant messaging aliases, phone numbers) for contacts that users of the digital assistant service have saved.

When delegate-user 106A sends the email displayed on computing device 104A, that email is automatically routed, via network 112, to the digital assistant service for processing because the digital assistant email address is included in the "Cc" field of the email. Upon receiving the meeting request email, the digital assistant service may analyze calendar information for the manager and the invitee, and identify a time the next week that both the manager and the invitee are free for the Project X meeting referenced in the meeting request email. In some examples, the analyzed calendar information for one or both of the manager and/or the invitee may be included in user store 116. In other examples, the digital assistant service may have to access calendar information for one or both of the manager and/or the invitee from local devices rather than user store 116. For example, if the invitee's calendar information is not located in user store 116, the digital assistant service may send an email to the invitee asking for permission to access the invitee's calendar information for the purposes of scheduling a meeting with the manager. Once the digital assistant service has identified a time that the meeting for Project X can be held, the digital assistant service may create a meeting entry in the manager's calendar and the invitee's calendar. In some examples, the digital assistant service may send a confirmation email regarding the email to the manager, the invitee, and/or delegate user 106A when the meeting entry has been created.

In the illustrated example, the digital assistant service has identified that no location for the meeting has been identified in the meeting request. As such, although the meeting request was sent from the manager's email account, a follow-up email is nonetheless sent from the digital assistant service to the delegate-user 106A asking the delegate to provide the digital assistant service with a mobile phone number where the invitee can reach the manager for the meeting. The follow-up email is shown on computing device 104B, which delegate-user 106B (the same user as delegate-user 106A) is accessing his email account from. The delegate is emailed for this meeting follow-up query because the original meeting request email was sent from the manager's email account by the delegate-user 106A in a delegate ("on behalf of") capacity.

Figure 2:
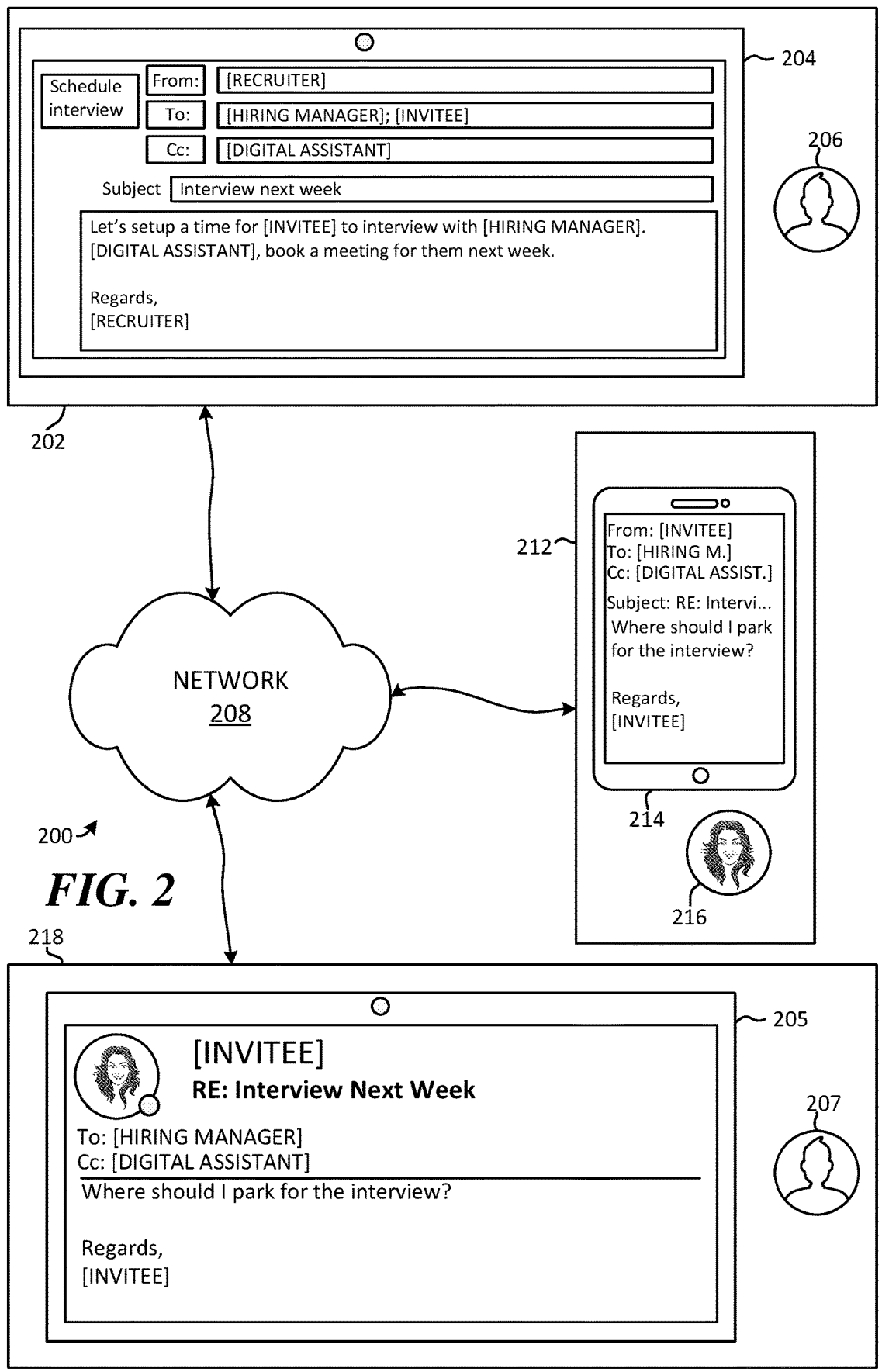
FIG. 2 illustrates an exemplary environment for routing human follow-up queries by a digital assistant.

FIG. 2 illustrates an exemplary environment 200 for routing human follow-up queries by a digital assistant. Environment 200 includes message creation sub-environment 202, meeting follow-up sub-environment 218, invitee query sub-environment 212, and network 208. Any of the devices shown in environment 200 can communicate with one another and with the digital assistant service via network 208.

In some examples, a first user (e.g., a recruiter) may utilize an API to communicate with the digital assistant service to schedule a meeting between a first third-party (e.g., a hiring manager) and one or more secondary third parties (e.g., one or more interview candidates), with the API specifying to the digital assistant service which parties are to attend the meeting, and which parties should receive follow-up replies to the initial communication sent by the first user (e.g., whether replies from an interview candidate should be sent to a hiring manager). In other examples, the digital assistant service may identify which parties are to attend the meeting, and which parties should receive follow-up replies to the initial communication sent by the first user, based on the headers in an initial communication sent from the first user. In still other examples, the first user may provide a spoken utterance to the digital assistant service, and the digital assistant service may identify an intent from the utterance from which the digital assistant service determines which parties are to attend the meeting, and which parties should receive follow-up replies to the initial communication sent by the first user.

In message creation sub-environment 202, recruiter 206 has signed into a recruiter software suite that includes an application (shown on computing device 204) for scheduling an interview between a interviewee/invitee 216 and a hiring manager 207. In this example, an API associated with the scheduling application and the digital assistant service may specify in any interview scheduling requests sent to the digital assistant service that follow-up questions from the invitee 216 (i.e., replies by the invitee 216 to the original interview request) be routed by the digital assistant service directly to hiring manager 207. In this example, recruiter 206 sends the following message via the scheduling application: "Let's setup a time for [INVITEE] to interview with [HIRING MANAGER]. [DIGITAL ASSISTANT], book a meeting for them next week. Regards, [RECRUITER]." The message is sent to the digital assistant service via an API, which indicates that any follow-up messages from the invitee 216 be sent directly to hiring manager 207. The digital assistant service routes the original scheduling message, via network 208, to one or both of invitee 216 and hiring manager 207. Invitee 216 then replies to the scheduling message, with the follow-up inquiry shown on computing device 214. Specifically, the follow-up inquiry states: "Where should I park for the interview? Regards, [INVITEE], with [HIRING MANAGER] in the "to" message field, and [DIGITAL ASSISTANT] in the "Cc" message field. Because the API specifies that all follow-up replies/inquiries be routed directly to hiring manager 207, the digital assistant service routes invitee 216's inquiry/reply, via network 208, directly to a messaging account of hiring manager 207, as shown on computing device 218 in meeting follow-up sub-environment 218.

Figure 3:
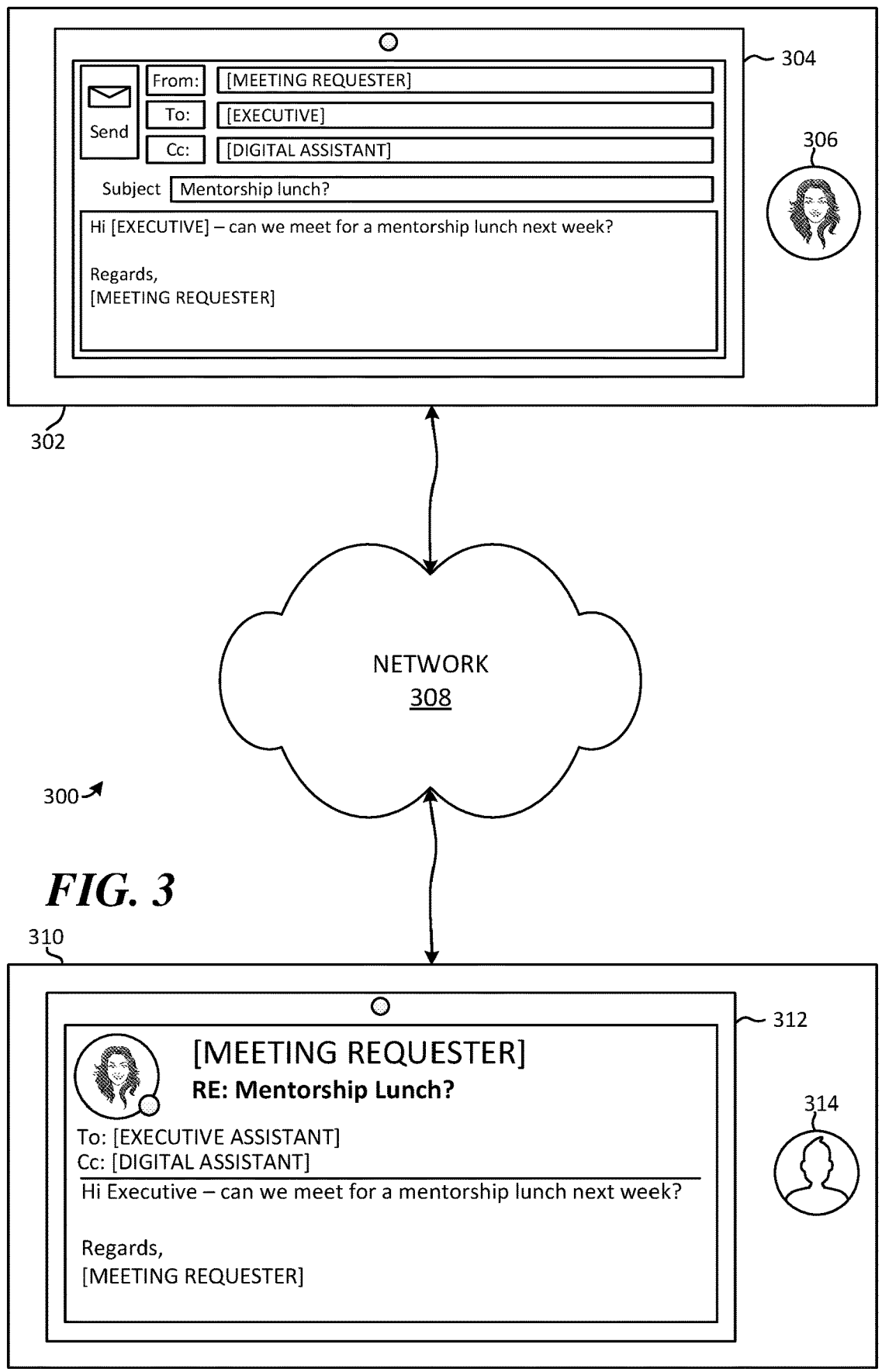
FIG. 3 illustrates an exemplary environment for routing scheduling messages to a delegate by a digital assistant.

FIG. 3 illustrates an exemplary environment 300 for routing scheduling messages to a delegate by a digital assistant. Exemplary environment 300 includes meeting request sub-environment 302, routed meeting request sub-environment 310, and network 308. Any of the devices shown in environment 200 can communicate with one another and with the digital assistant service via network 308.

In this example, an executive has modified settings associated with her email account, digital assistant, and calendar to allow her human executive assistant 314 to handle scheduling of meetings from her email account. By granting her human executive assistant 314 with delegate authority of her email account for scheduling purposes, the digital assistant service may route any meeting follow-up queries directly to the executive assistant's 314 email account rather than executive's email account, thereby allowing the executive to spend more time on higher-level tasks, while allowing the executive assistant 314 to handle scheduling tasks on the executive's behalf.

Meeting requester 306 has drafted an email on computing device 304 to the executive that states: "Hi [EXECUTIVE]—can we meet for a mentorship lunch next week?". In the meeting request email, the executive is included in the "to" field, and the digital assistant is included in the "Cc" field.

When meeting requestor 306 sends the meeting request email, it is directed, via network 308, to the digital assistant service. The digital assistant service determines based on the delegate authority that the executive has granted the executive assistant 314, that all meeting requests and scheduling follow-up queries are to be routed directly to the executive assistant 314. As such, the digital assistant service sends the meeting request email directly to the executive assistant 314, as shown on computing device 312, rather than sending the meeting request email to the executive despite the executive's email address being in the "to" field of the meeting request email. In this manner the executive assistant can manage the scheduling of the meeting between the meeting requestor and the executive, leaving the executive with more time to work on higher-level executive tasks.

Figure 4:
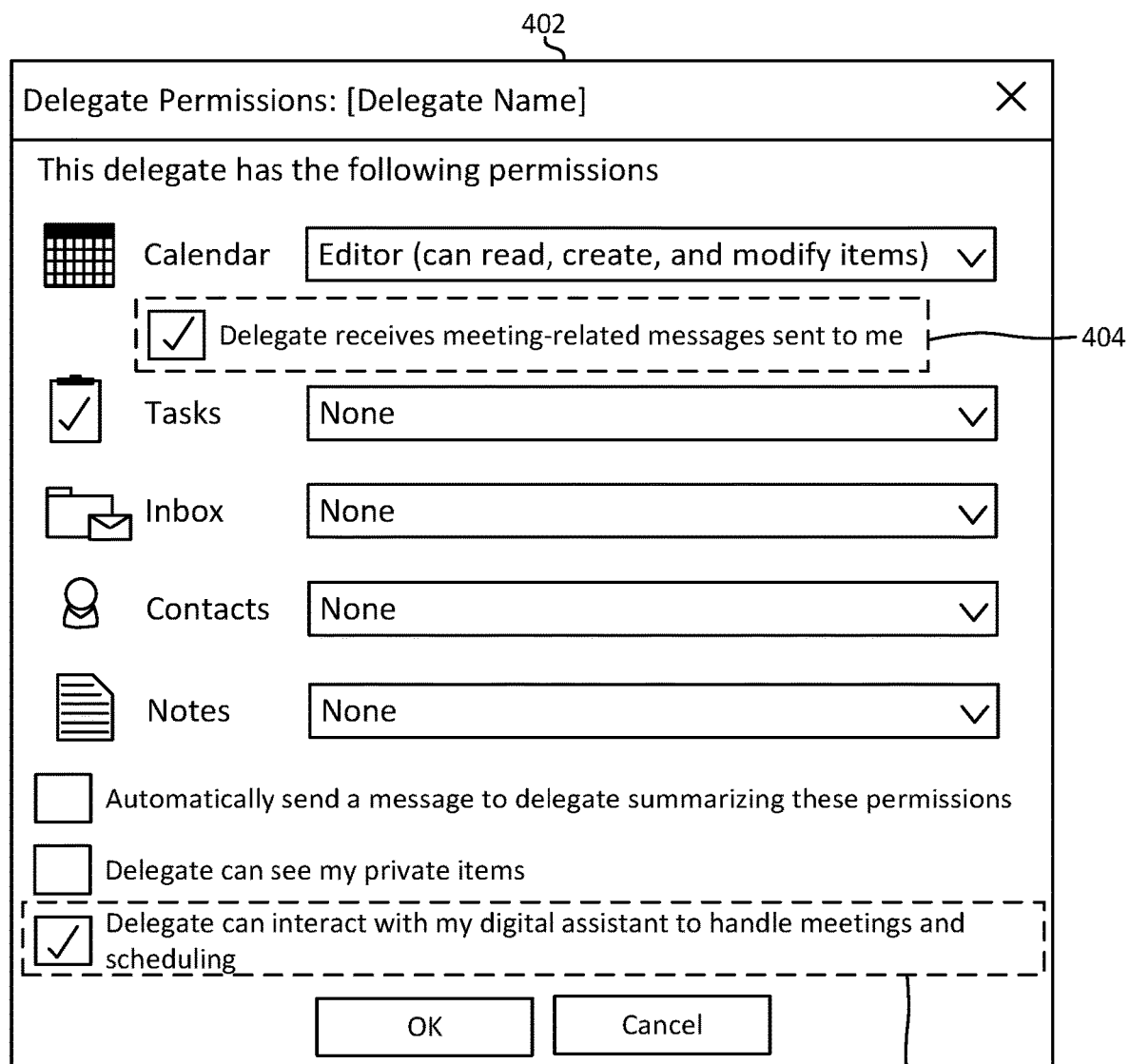
FIG. 4 illustrates exemplary user interface elements in a delegate settings menu for creating rules and permissions for delegates.

FIG. 4 illustrates exemplary user interface elements in a delegate settings menu 402 for creating rules and permissions for delegates. Delegate settings menu includes a plurality of settings that a principal (e.g., a manager, an executive) may modify to grant and/or take away delegate authority with regard to the principal's email account, calendar information, and digital assistant in the scheduling of meetings by a delegate for the principal. Delegate settings menu 402 includes user interface element 404, which when selected, provides for automatic routing of meeting-related messages that would otherwise be provided to the principal, to be sent from the digital assistant service directly to the delegate when the digital assistant is included in the "to" or "Cc" fields of a meeting request. Thus, when user interface element 404 is selected and a user sends a meeting-related email to the principal while also including the digital assistant on that email, the digital assistant service may automatically route that email, as well as any follow-up queries from the user and/or the digital assistant, to the delegate.

Delegate settings menu 402 also includes user interface element 406, which when selected, allows a principal's delegate to utilize the executive's digital assistant to setup meetings and handle follow-up queries about meetings sent from the digital assistant service. Thus, when user interface element 406 is selected and the digital assistant service needs clarification regarding a time, date, place, contact information, and/or persons to include in for a meeting being scheduled with a principal, the digital assistant service may send those clarification queries directly to the delegate rather than the principal.

Figure 5A:
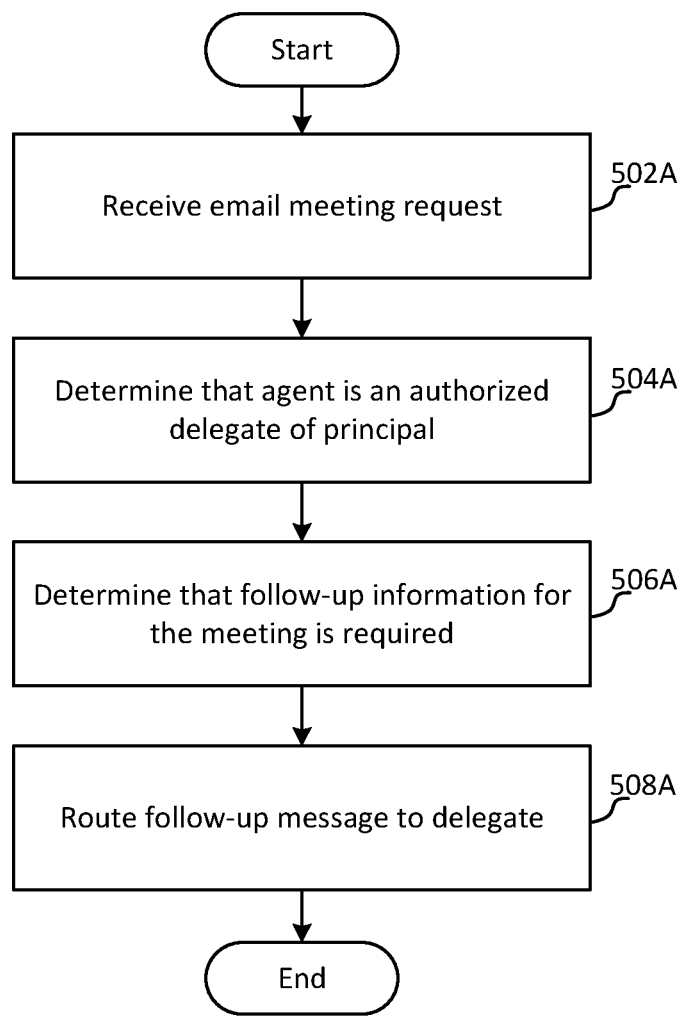
FIG. 5A is an exemplary method for routing meeting request follow-up queries by a digital assistant.

FIG. 5A is an exemplary method 500A for routing meeting request follow-up queries by a digital assistant. The method begins at a start operation and flow moves to operation 502A.

At operation 502A a request to schedule a meeting between an invitee and a principal is received by a digital assistant service, wherein the request is sent by an agent of the principal from an electronic messaging account of the principal. The principal may have previously granted the agent with delegate authority to schedule meetings between the principal and third-parties. That is, the principal may have utilized one or more authorization settings associated with the digital assistant service, the principal's electronic messaging account, the principal's calendar application account, and/or the principal's contacts application account, to grant the agent authority to send scheduling emails from the principal's electronic messaging account, access the principal's calendar and/or contacts applications, and receive follow-up communications related to scheduling messages. In some examples, the digital assistant service may receive the meeting request based on the digital assistant service (e.g., cortana@calendar.help) being included in the "to" and/or "Cc" fields of the meeting request. In other examples, the digital assistant service may automatically receive every meeting request that is sent from principal's electronic messaging account by the agent while utilizing delegate authority (e.g., "sent on behalf of"). In additional examples, the agent may select which messages sent from the principal's electronic messaging account are to be sent to the digital assistant service.

From operation 502A flow continues to operation 504A where a determination is made by the digital assistant service that the agent is a delegate of the principal's electronic messaging account with scheduling authorization. In some examples, the digital assistant service may make this determination by determining that one or more settings associated with the principal's electronic messaging account, calendar application, and/or contacts application, designates the agent as a delegate of the principal's electronic messaging account. In other examples, the digital assistant service may make this determination by identifying from a first header of the meeting request that the agent is the sender of the request, and identifying from a second header of the meeting request that the agent is sending the request on behalf of the principal.

From operation 504A flow continues to operation 506A where a determination is made by the digital assistant service that follow-up information for the meeting is required. In some examples, the digital assistant service may make this determination based on receiving a request for follow-up information in a reply from one or more invitees of the meeting request. In other examples, the digital assistant service may make this determination by determining that at least one of: a time, a date, a location, and/or a contact phone number for the principal are not included in the meeting request. For example, if the meeting request does not indicate a way for an invitee to contact the principal for the meeting, the digital assistant service may determine that additional information is required for the meeting.

From operation 506A flow continues to operation 508A where an electronic message requesting the follow-up information is routed by the digital assistant service to an electronic messaging account of the agent based on the principal's designation of the agent as a delegate. In examples where the digital assistant service identifies additional follow-up information that is required for the meeting, the digital assistant service may generate an electronic message requesting the required information and send that message directly to the agent-delegate. In examples where the request for additional information is sent from an invitee of the meeting request as a reply to the meeting request, the digital assistant service may route the invitee's reply directly to the agent-delegate.

From operation 508A flow continues to an end operation, and the method 500A ends.

Figure 5B:
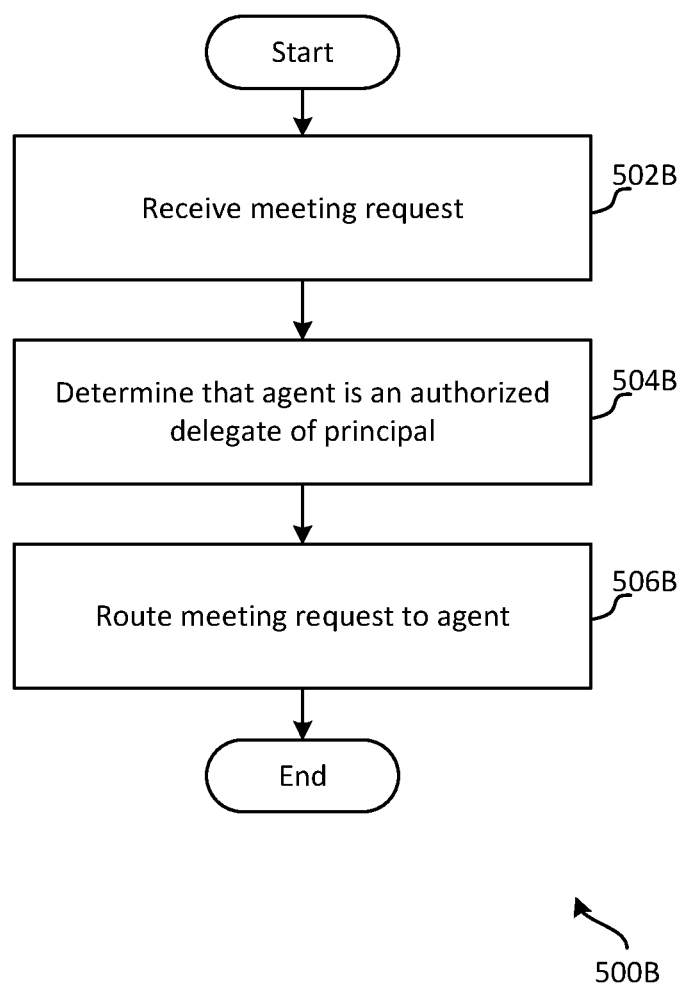
FIG. 5B is an exemplary method for routing meeting requests sent to a principal to a designated delegate-agent.

FIG. 5B is an exemplary method 500B for routing meeting requests sent to a principal to a designated delegate-agent. The method 500 begins at a start operation and flow moves to operation 502B.

At operation 502B a request to schedule a meeting between a third party and a principal is received, wherein the request is an electronic message sent to an electronic messaging account of the principal. For example, a third party that wishes to schedule a time to meet with the principal may send an electronic message to the principal with an indication to have a digital assistant help arrange the meeting. In some examples, the indication to have the digital assistant help arrange the meeting may be the inclusion of the digital assistant (e.g., cortana@calendar.help) in the "to" and/or "Cc" fields of the meeting request. In other examples, the request may be a verbal request to arrange the meeting and the indication may be the use of the digital assistant in making the request (e.g., the third party simply issuing the meeting request verbal command to the digital assistant).

From operation 502B flow continues to operation 504B where a determination is made by the digital assistant service that there is an agent that is a delegate of the principal's electronic messaging account with scheduling authorization. In some examples, the digital assistant service may make this determination by determining that one or more settings associated with the principal's electronic messaging account, calendar application, and/or contacts application, designate an agent as a delegate of the principal's electronic messaging account with scheduling authorization. In other examples, the principal may have previously indicated directly to the digital assistant service that an agent has authority to schedule meetings on the principal's behalf.

From operation 504B flow continues to operation 506B where the meeting request is routed by the digital assistant service to an electronic messaging account of the agent based on the agent being a delegate of the principal's electronic messaging account with scheduling authorization. That is, although the meeting request was explicitly sent by the third-party requester to the principal's account, that message is routed to the agent with delegate authority rather than to the principal. In other examples, the message may be routed to the agent with delegate authority and to the principal.

In some examples, the digital assistant service may determine follow-up information for the meeting is required. In examples where the digital assistant service directly identifies that follow-up information is required based on the meeting request not having a time, date, location, and/or a contact phone number, the digital assistant service may generate a request for the required information and send that request directly to the agent-delegate. In examples where the follow-up information is received as part of a reply to a scheduling message for the meeting by the third-party, the third-party's reply may sent directly to the agent-delegate.

From operation 506B flow continues to operation 506B and the method 500B ends.

Figure 6:
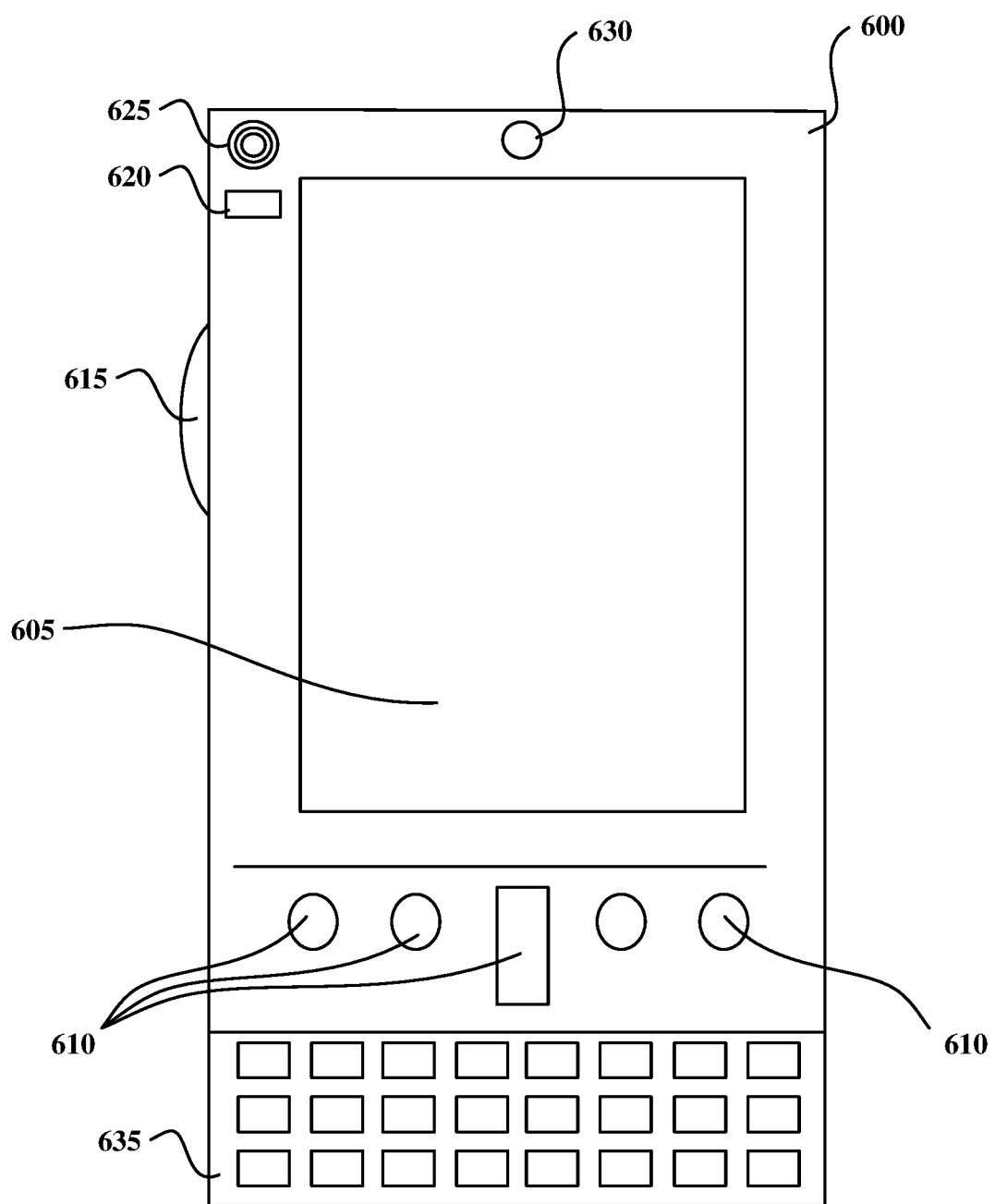
FIGS. 6 and 7 are simplified diagrams of a mobile computing device with which aspects of the disclosure may be practiced.
Figure 7:
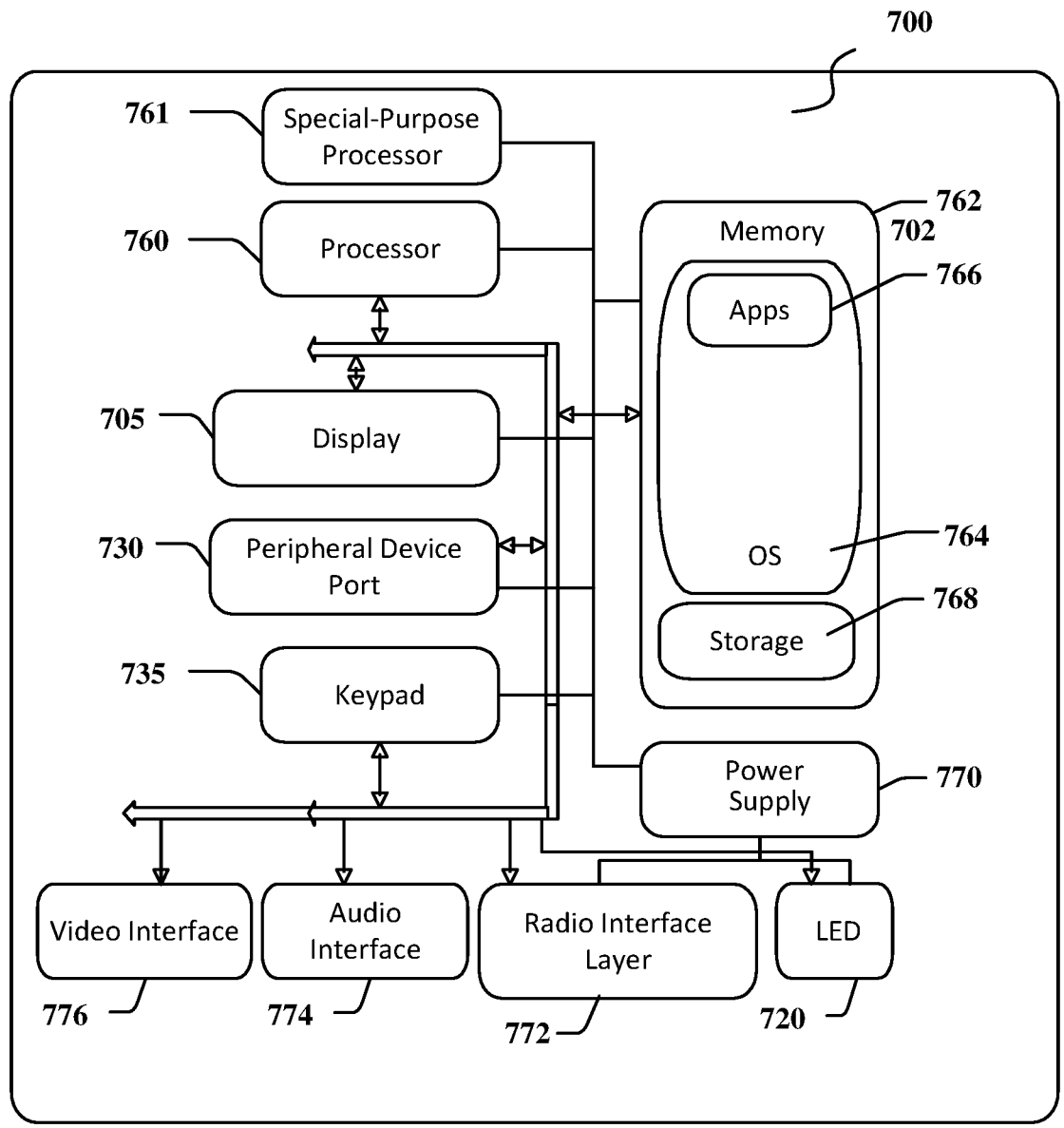

FIGS. 6 and 7 illustrate a mobile computing device 600, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 6, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or fewer input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 7 is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 864. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including instructions for providing and operating a digital assistant computing platform.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 620 may be used to provide visual notifications, and/or an audio interface 774 may be used for producing audible notifications via the audio transducer 625. In the illustrated embodiment, the visual indicator 620 is a light emitting diode (LED) and the audio transducer 625 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 625, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 630 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7 by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
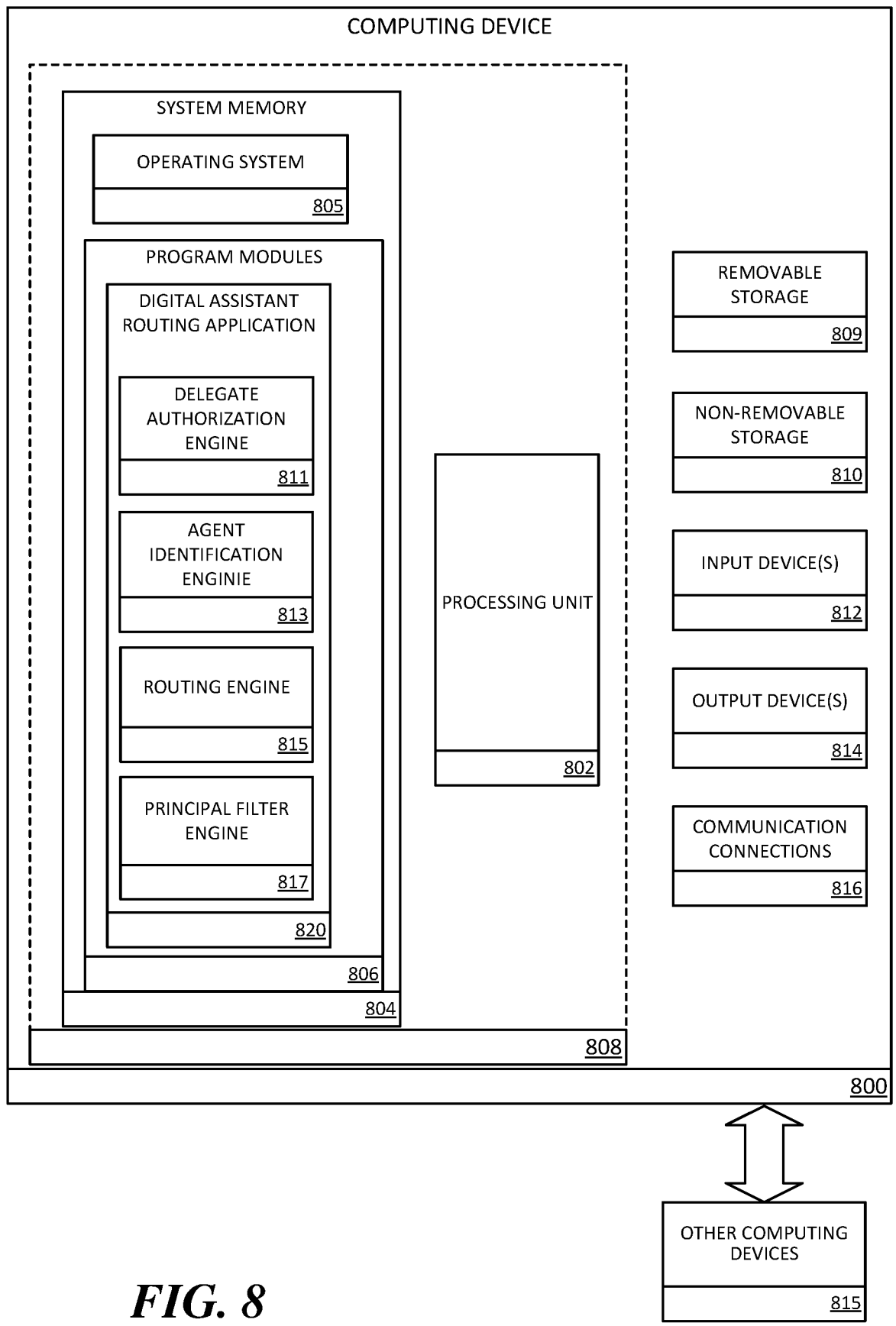
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may have computer executable instructions for assisting with execution of verbal digital assistant commands in a group device environment. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 suitable for running one or more digital assistant programs. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., digital assistant routing application 820) may perform processes including, but not limited to, the aspects, as described herein. According to examples, the delegate authorization engine 811 may perform one or more operations associated with receiving delegate authorization settings from a principal, and granting or denying access to one or more applications associated with the principal based on those settings. The agent identification engine 813 may perform one or more operations associated with identifying that a principal has granted an agent with delegate authority to schedule meetings on the principal's behalf. The routing engine 815 may perform one or more operations associated with routing meeting request messages from third parties and meeting follow-up queries directly to a delegate. The principal filter engine 817 may perform one or more operations associated with filtering messages from a principal's messaging inbox that were sent by third parties to a principal to schedule a meeting.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9:
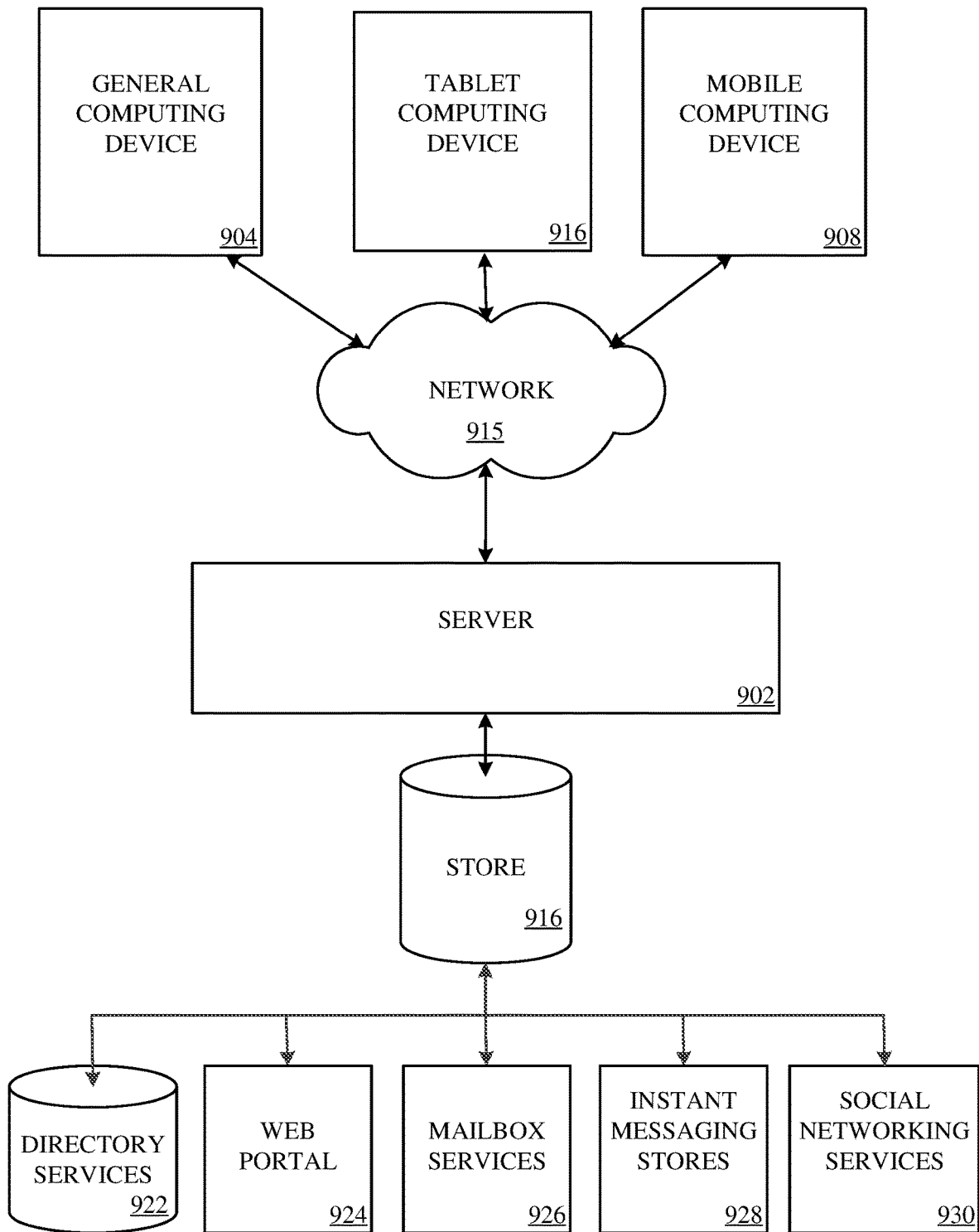
FIG. 9 is a simplified block diagram of a distributed computing system in which aspects of the present disclosure may be practiced.

FIG. 9 illustrates one aspect of the architecture of a system for processing data received at a computing system from a remote source, such as a personal/general computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. The program modules 806 may be employed by a client that communicates with server device 902, and/or the program modules 806 may be employed by server device 902. The server device 902 may provide data to and from a client computing device such as a personal/general computer 904, a tablet computing device 906 and/or a mobile computing device 908 (e.g., a smart phone) through a network 915. By way of example, the computer system described above with respect to FIGS. 6-8 may be embodied in a personal/general computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The systems, methods, and devices described herein provide technical advantages for scheduling meetings by delegates utilizing a digital assistant service. By intelligently routing scheduling communications directly to delegates computer processing and storage costs are reduced. For example, prior to the current invention, managers and executive with executive assistants would either have to: (1) forward scheduling messages that were sent to them to their executive assistants for the assistants to setup meetings and/or deal with follow-up questions; or (2) personally setup meetings and deal with follow-up questions. By intelligently routing messages sent to principals according to the description herein, storage costs are reduced by only having a single scheduling email sent by a third party being stored (i.e., only a single copy of the email that is sent from the digital assistant service to the delegate need be saved), rather than having a first copy being saved in association with the principal's account and a duplicate forwarded copy being saved in association with the delegate's account. Processing costs are also reduced according to the description provided herein in that principals do not have to forward each scheduling and/or meeting request follow-up message to their assistant delegates. Instead, the digital assistant service can identify scheduling emails sent to or from the principal's account and route any follow-up messages directly back to the assistant delegates, thereby also reducing the burden to the principals of performing low-level scheduling tasks.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method for routing an electronic meeting request by a digital assistant service, the method comprising:
   receiving, by the digital assistant service, an electronic request to schedule a meeting between an invitee and a principal;
   analyzing, by the digital assistant service, a plurality of headers in the electronic request;
   determining, by the digital assistant service from a first one of the plurality of headers, that an agent of the principal sent the electronic request;
   determining, by the digital assistant service from a second one of the plurality of headers that the agent sent the electronic request on behalf of the principal from an electronic messaging account of the principal;
   determining, based on the analysis of the plurality of headers by the digital assistant service, that the agent is a delegate of the principal's electronic messaging account with scheduling authorization;
   determining, by the digital assistant service, that follow-up information for the meeting is required;
   routing, via a distributed computer network by the digital assistant service based on the principal's designation of the agent as a delegate, an electronic message requesting the follow-up information to an electronic messaging account of the agent;
   receiving, by the digital assistant service, the follow-up information from the electronic messaging account of the agent;
   analyzing, by the digital assistant service, electronic calendar information in a network-based user store, for the invitee and the principal;
   identifying, based on the analysis, a time that is free for the invitee and the principal; and
   automatically generating, by the digital assistant service, a first meeting entry at the time for the meeting in an electronic calendar of the principal, and a second meeting entry at the time for the meeting in an electronic calendar of the invitee.

2. The computer-implemented method of claim 1, wherein the follow-up information comprises a phone number where the principal can be reached for the meeting.

3. The computer-implemented method of claim 1, wherein the follow-up information comprises a location where the meeting is to take place.

4. The computer-implemented method of claim 1, wherein the follow-up information comprises a date and a time when the meeting is to take place.

5. The computer-implemented method of claim 1, wherein determining, by the digital assistant service, that follow-up information for the meeting is required comprises:
   receiving an electronic request for the follow-up information from the invitee.

6. The computer-implemented method of claim 1, wherein determining, by the digital assistant service, that follow-up information for the meeting is required comprises:
   determining, by the digital assistant service, that at least one of: a time; a date; a location; and a contact phone number for the principal, are not included in the electronic request.

7. A computer-readable storage device comprising executable instructions that, when executed by a processor, assist with routing an electronic meeting request by a digital assistant service, the computer-readable storage device including instructions executable by the processor for:
   receiving, by the digital assistant service, an electronic request to schedule a meeting between a user and a principal;
   analyzing, by the digital assistant service, a plurality of headers in the electronic request;
   determining, by the digital assistant service from a first one of the plurality of headers, that an agent of the principal sent the electronic request;
   determining, by the digital assistant service from a second one of the plurality of headers that the agent sent the electronic request on behalf of the principal from an electronic messaging account of the principal;
   determining, based on the analysis of the plurality of headers by the digital assistant service, that an agent is a delegate of the principal's electronic messaging account with scheduling authorization;
   routing, by the digital assistant service based on the agent being a delegate of the principal's electronic messaging account with scheduling authorization, the electronic request to an electronic messaging account of the agent
   determining, by the digital assistant service, that follow-up information for the meeting is required;
   routing, via a distributed computer network by the digital assistant service based on the agent being a delegate of the principal's electronic messaging account with scheduling authorization, an electronic message requesting the follow-up information to the electronic messaging account of the agent;
   receiving, by the digital assistant service, the follow-up information from the electronic messaging account of the agent;
   analyzing, by the digital assistant service, electronic calendar information in a network-based user store, for the user and the principal;
   identifying, based on the analysis, a time that is free for the user and the principal; and
   automatically generating, by the digital assistant service, a first meeting entry at the time for the meeting in an electronic calendar of the principal, and a second meeting entry at the time for the meeting in an electronic calendar of the user.

8. The computer-readable storage device of claim 7, wherein in determining, by the digital assistant service, that follow-up information for the meeting is required, the instructions are further executable by the processor for:
receiving an electronic request for the follow-up information from the user.

9. The computer-readable storage device of claim 7, wherein in determining, by the digital assistant service, that follow-up information for the meeting is required, the instructions are further executable by the processor for:
determining, by the digital assistant service, that at least one of: a time; a date; a location; and a contact number for the principal, are not included in the electronic request.

10. The computer-readable storage device of claim 7, wherein the follow-up information comprises a phone number where the principal can be reached for the meeting.

11. The computer-readable storage device of claim 7, wherein the follow-up information comprises a location where the meeting is to take place.

12. The computer-readable storage device of claim 7, wherein the follow-up information comprises a date and time when the meeting is to take place.

13. A system for routing a meeting request by a digital assistant service, comprising:
a memory for storing executable program code; and
one or more processors, functionally coupled to the memory, the one or more processors being responsive to computer-executable instructions contained in the program code and operative to:
receive, by the digital assistant service, an electronic request to schedule a meeting between an invitee and a principal;
analyze, by the digital assistant service, a plurality of headers in the electronic request;
determine, by the digital assistant service from a first one of the plurality of headers, that an agent of the principal sent the electronic request;
determine, by the digital assistant service from a second one of the plurality of headers that the agent sent the electronic request on behalf of the principal from an electronic messaging account of the principal;
determine, based on the analysis of the plurality of headers by the digital assistant service, that the agent is a delegate of the principal's electronic messaging account with scheduling authorization;
determine, by the digital assistant service, that follow-up information for the meeting is required;
rout, via a distributed computer network by the digital assistant service based on the principal's designation of the agent as a delegate, an electronic message requesting the follow-up information to an electronic messaging account of the agent;
receive, by the digital assistant service, the follow-up information from the electronic messaging account of the agent;
analyze, by the digital assistant service, electronic calendar information in a network-based user store, for the invitee and the principal;
identify, based on the analysis, a time that is free for the invitee and the principal; and
automatically generate, by the digital assistant service, a first meeting entry at the time for the meeting in an electronic calendar of the principal, and a second meeting entry at the time for the meeting in an electronic calendar of the invitee.

14. The system of claim 13, wherein determining, by the digital assistant service, that follow-up information for the meeting is required comprises: receiving an electronic request for the follow-up information from the invitee.

15. The system of claim 13, wherein in determining, by the digital assistant service, that follow-up information for the meeting is required, the one or more processors are further responsive to the computer-executable instructions and operative to:
determine that at least one of: a time; a date; a location; and a contact phone number for the principal, are not included in the electronic request.

16. The system of claim 13, wherein the follow-up information comprises a phone number where the principal can be reached for the meeting.

17. The system of claim 13, wherein the follow-up information comprises a location where the meeting is to take place.

18. The system of claim 13, wherein the follow-up information comprises a date and time when the meeting is to take place.

* * * * *